US008703884B2

(12) United States Patent
Mariott et al.

(10) Patent No.: US 8,703,884 B2
(45) Date of Patent: Apr. 22, 2014

(54) ADDITIVE FOR POLYOLEFIN POLYMERIZATION PROCESSES

(75) Inventors: Wesley R. Mariott, Pearland, TX (US); F. David Hussein, Cross Lanes, WV (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 13/993,646

(22) PCT Filed: Dec. 6, 2011

(86) PCT No.: PCT/US2011/063456
§ 371 (c)(1),
(2), (4) Date: Jun. 12, 2013

(87) PCT Pub. No.: WO2012/087560
PCT Pub. Date: Jun. 28, 2012

(65) Prior Publication Data
US 2013/0267666 A1 Oct. 10, 2013

Related U.S. Application Data

(60) Provisional application No. 61/426,106, filed on Dec. 22, 2010.

(51) Int. Cl.
*C08F 2/44* (2006.01)
*C08F 2/00* (2006.01)
*C08F 4/609* (2006.01)
*C08F 4/629* (2006.01)
*C08F 210/16* (2006.01)

(52) U.S. Cl.
USPC ............... 526/60; 526/62; 526/74; 502/124; 502/155; 502/159

(58) Field of Classification Search
USPC ............... 526/60, 62, 74; 502/124, 155, 159
See application file for complete search history.

(56) References Cited

U.S. PATENT DOCUMENTS

| | | | |
|---|---|---|---|
| 4,012,574 A | 3/1977 | Jones et al. | |
| 4,259,087 A * | 3/1981 | Naiman et al. | 44/332 |
| 4,532,311 A | 7/1985 | Fulks et al. | |
| 4,555,370 A | 11/1985 | Klauke et al. | |
| 4,803,251 A | 2/1989 | Goode et al. | |
| 4,855,370 A | 8/1989 | Chirillo et al. | |
| 5,011,647 A | 4/1991 | Meyer et al. | |
| 5,026,795 A * | 6/1991 | Hogan | 526/74 |
| 5,034,480 A | 7/1991 | Funk et al. | |
| 5,034,481 A | 7/1991 | Funk et al. | |
| 5,066,736 A | 11/1991 | Dumain et al. | |
| 5,126,414 A | 6/1992 | Cooke et al. | |
| 5,283,278 A | 2/1994 | Daire et al. | |
| 5,332,706 A | 7/1994 | Nowlin et al. | |
| 5,391,657 A | 2/1995 | Song et al. | |
| 5,405,922 A | 4/1995 | DeChellis et al. | |
| 5,427,991 A | 6/1995 | Turner | |
| 5,436,304 A | 7/1995 | Griffin et al. | |
| 5,461,123 A | 10/1995 | Song et al. | |
| 5,473,028 A | 12/1995 | Nowlin et al. | |
| 5,492,975 A | 2/1996 | Peifer et al. | |
| 5,610,244 A | 3/1997 | Govoni et al. | |
| 5,627,243 A | 5/1997 | H am al ainen et al. | |
| 5,643,847 A | 7/1997 | Walzer, Jr. | |
| 5,648,581 A | 7/1997 | Kubo et al. | |
| 5,661,095 A | 8/1997 | Meverden et al. | |
| 5,929,179 A * | 7/1999 | Strobbe et al. | 526/64 |
| 6,008,662 A | 12/1999 | Newton et al. | |
| 6,146,574 A | 11/2000 | Henkee et al. | |
| 6,548,610 B2 | 4/2003 | Bartilucci et al. | |
| 2002/0103072 A1 | 8/2002 | Brant et al. | |
| 2005/0148742 A1 | 7/2005 | Hagerty et al. | |
| 2008/0027185 A1 | 1/2008 | Markel et al. | |
| 2008/0119622 A1* | 5/2008 | Miserque et al. | 526/62 |

FOREIGN PATENT DOCUMENTS

| | | |
|---|---|---|
| EP | 0229368 | 11/1990 |
| EP | 0549252 A1 | 6/1993 |
| EP | 0453116 | 4/1995 |
| EP | 0811638 A2 | 12/1997 |
| EP | 1106629 A | 6/2001 |
| WO | WO 96/08520 | 3/1996 |
| WO | WO 9611961 | 4/1996 |
| WO | WO 97/06186 | 2/1997 |
| WO | WO 97/14721 | 4/1997 |
| WO | WO 97/15602 | 5/1997 |
| WO | WO 97/27224 | 7/1997 |
| WO | WO 97/46599 | 12/1997 |
| WO | WO 99/61485 | 12/1999 |
| WO | WO 01/23440 A1 | 4/2001 |
| WO | WO 03/070861 A2 | 8/2003 |
| WO | WO 2005/068507 | 7/2005 |
| WO | WO 2010/132333 A2 | 11/2010 |

* cited by examiner

*Primary Examiner* — Fred M Teskin
(74) *Attorney, Agent, or Firm* — Jennifer A. Schmidt

(57) ABSTRACT

A polymerization process is disclosed comprising polymerizing an olefin to form an olefin-based polymer in a polymerization reactor; and introducing a polyetheramine additive to the polymerization reactor. The process may further comprise monitoring static in the polymerization reactor; maintaining the static at a desired level by use of a polyetheramine additive, where the polyetheramine additive is present in the reactor in the range from about 0.1 to about 500 ppmw, based on the weight of polymer produced by the process.

17 Claims, No Drawings

ADDITIVE FOR POLYOLEFIN POLYMERIZATION PROCESSES

CROSS-REFERENCE TO RELATED APPLICATIONS

This application is a National Stage application under 35 U.S.C. §371 of International Application No. PCT/US2011/063456, filed Dec. 6, 2011, that claims the benefit of Ser. No. 61/426,106, filed Dec. 22, 2010, the disclosures of which are incorporated by reference in their entireties.

FIELD OF THE INVENTION

Disclosed herein are additives for use in polymerization processes. More specifically, disclosed herein is the use of polyetheramine additives and/or polyalkylene oxide additives in polymerization processes.

BACKGROUND

Metallocene catalysts allow the production of polyolefins with unique properties such as narrow molecular weight distributions. These properties in turn result in improved structural performance in products made with the polymers, such as greater impact strength and clarity in films. While metallocene catalysts have yielded polymers with improved characteristics, they have presented new challenges when used in traditional polymerization systems.

For example, when metallocene catalysts are used in fluidized bed reactors, "sheeting" and the related phenomena "drooling" may occur. See U.S. Pat. Nos. 5,436,304 and 5,405,922. "Sheeting" is the adherence of fused catalyst and resin particles to the walls of the reactor. "Drooling" or dome sheeting occurs when sheets of molten polymer form on the reactor walls, usually in the expanded section or "dome" of the reactor, and flow along the walls of the reactor and accumulate at the base of the reactor. Sheeting and drooling may be a problem in commercial gas phase polyolefin production reactors if the risk is not properly mitigated. The problem is characterized by the formation of large, solid masses of polymer on the walls of the reactor. These solid masses or polymer (the sheets) may eventually become dislodged from the walls and fall into the reaction section, where they may interfere with fluidization, block the product discharge port, and usually force a reactor shut-down for cleaning.

Various methods for controlling sheeting have been developed. These often involve monitoring the static charges near the reactor wall in regions where sheeting is known to develop and introducing a static control agent into the reactor when the static levels fall outside a predetermined range. See for example, U.S. Pat. Nos. 4,803,251 and 5,391,657. The static charge may be monitored with a static probe or voltage indicator. See for example, U.S. Pat. Nos. 4,532,311; 4,855,370; 5,391,657; and 6,548,610. Conventional static probes are described in U.S. Pat. Nos. 4,532,311; 5,648,581; and 6,008,662.

Other background references include U.S. Patent Application Publication No. 2002/103072U.S; U.S. Pat. Nos. 5,066,736; 5,126,414; 5,283,278; 5,332,706; 5,427,991; 5,461,123; 5,473,028; 5,492,975; 5,610,244; 5,627,243; 5,643,847; and 5,661,095; PCT Publications WO 96/08520; WO 97/06186; WO 97/14721; WO 97/15602; WO 97/27224; WO 99/61485; WO 2005/068507; and European Publications EP-A 1 0 549 252; EP 0 811 638 A; and EP 1 106 629 A.

Various antistatic agents, static control agents, and process "continuity additives" are disclosed in U.S. Patent Appl. Pub. No. 2005/0148742, U.S. Pat. Nos. 4,012,574; 4,555,370; 5,034,480; and 5,034,481; European Publications EP 0229368 and EP 0 453116, and PCT Publications WO 96/11961 and WO 97/46599. U.S. Patent Appl. Pub. No. 2008/027185, discloses the use of aluminum stearate, aluminum distearate, ethoxylated amines, mixtures of polysulfone copolymer, polymeric polyamine, and oil-soluble sulfonic acid, as well as mixtures of carboxylated metal salts with amine-containing compounds that may also be used to control static levels in a reactor.

Static control agents, including several of those described above, may result in reduced catalyst productivity. The reduced productivity may be as a result of residual moisture in the additive. Additionally, reduced productivity may result from interaction of the polymerization catalyst with the static control agent, such as reaction or complexation with hydroxyl groups in the static control agent compounds. Depending upon the static control agent used and the required amount of the static control agent to limit sheeting, loss in catalyst activities of 40% or more have been observed.

Therefore, there exists a need for useful additives for controling static levels, and thus sheeting, in fluidized bed reactors, especially for use with metallocene catalyst systems.

SUMMARY

Disclosed herein are polymerization processes, comprising: polymerizing an olefin to form an olefin-based polymer in a polymerization reactor; and introducing a polyetheramine additive to the polymerization reactor.

Also disclosed herein are processes for copolymerizing ethylene and an alpha olefin in a gas phase reactor utilizing a metallocene catalyst, activator and support, comprising: combining reactants comprising ethylene and a comonomer in the presence of a catalyst, an activator and a support; monitoring static in the gas phase reactor by a probe selected from the a recycle line static probe, an upper bed static probe, an annular disk static probe, a distributor plate static probe, and any combination thereof; maintaining the static at a desired level by use of a polyetheramine additive, the polyetheramine additive present in the gas phase reactor in the range from about 0.1 to about 500 ppmw, based on the weight of polymer produced in the process.

Also disclosed herein is the use of a mixture of polyetheramine additives and one or more additional continuity additives. For example, a mixture of polyethyeramine and aluminum distearate may be used. In some embodiments, the polyetheramine and aluminum distearate additive mixture may be present in the gas phase reactor in the range from about 0.1 to about 500 ppmw, based on the weight of polymer produced in the process.

Also disclosed herein are catalyst systems comprising: a polymerization catalyst and a polyetheramine additive.

DETAILED DESCRIPTION

Before the present compounds, components, compositions, and/or methods are disclosed and described, it is to be understood that unless otherwise indicated this invention is not limited to specific compounds, components, compositions, reactants, reaction conditions, ligands, metallocene structures, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an" and "the" include plural referents unless otherwise specified.

Disclosed herein is the use of polyetheramine additives and/or polyalkylene oxide additives in polymerization processes, such as those for the production of ethylene- and propylene-based polymers. More specifically, disclosed herein is the use of polyetheramine additives and/or polyalkylene oxide additives to control static levels and/or reduce resin and catalyst particles adhesion in a polymerization reactor during the production of ethylene- or propylene-based polymers. Such additives may be useful, for example, where the polymerization is catalyzed with a metallocene catalyst. The polyetheramine additives and/or polyalkylene oxide additives may be added to a polymerization reactor to control static levels in the reactor, preventing, reducing, or reversing sheeting, drooling and other discontinuity events resulting from excessive static levels. In some embodiments, the polyetheramine additives and/or polyalkylene oxide additives may be used in combination with one or more additional continuity additives, for example a mixture of polyetheramine additive and an aluminum distearate additive may be used.

Polyetheramine Additives

Polyetheramine additives disclosed herein may include a polyetheramine. As used herein, the term "polyetheramine" refers to a polymer containing a polyether backbone that terminates in at least one amino group. The polyether backbone may be, for example, ethylene oxide-based, propylene oxide-based, 1,2 butylene oxide-based, tetramethylene oxide-based, or any combination thereof. The polyetheramines may be, for example, a block copolymer, a graft copolymer, or a block-graft copolymer. In some embodiments, the polyetheramine is a diblock copolymer or a triblock copolymer. In some embodiments, the polyetheramine may be a block copolymer of ethylene oxide and propylene oxide.

Suitable polyetheramines include, for example, monoamines, diamines, and triamines. For example, the polyether backbone may terminate in at least one primary amino group, or may terminate in at least one secondary amino group, or may terminate in at least one tertiary amino group.

An example of a suitable polyetheramine additive includes a polyetheramine of the following formula:

$$R^1(OCH_2CH_2)_a(OCH_2CH(R^2))_bR^3 \quad (1)$$

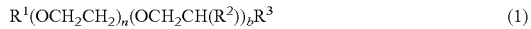

where $R^1$ comprises hydrogen, an alkyl group, a hydroxyl alkyl group, or an alkyl amine group; $R^2$ comprises hydrogen or an alkyl group; $R^3$ comprises hydrogen, an alkyl group, an alkoxy group, an amine group, or an alkyl amine group; a is 1 to 50; and b is 1 to 50. In some embodiments, $R^1$ comprises a C1 to C3 alkyl group, $R^2$ comprises hydrogen or a C1 alkyl group, and $R^3$ comprises an amine group, such as a primary amine group.

Another example of a suitable polyetheramine additive includes a polyetheramine of the following formula:

$$R^1(CH(R^2)CH_2O)_aCH_2CH(CH_3)NH_2 \quad (II)$$

where $R^1$ comprises hydrogen, an alkyl group, an alkoxy group, an amine group, or an alkyl amine group; $R^2$ comprises hydrogen or an alkyl group; and a is 1 to 100. In some embodiments, $R^1$ comprises an amine group, such as a primary amine group, and $R^2$ comprises hydrogen or a C1 alkyl group.

Yet another example of a suitable polyetheramine additive includes a polyetherdiamine of the following formula:

$$NH_2CH(CH_3)CH_2(OCH_2CH(CH_3))_a(OCH_2CH)_b$$
$$(OCH_2CH(CH_3))_cNH_2 \quad (III)$$

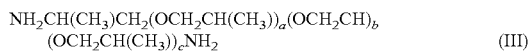

where a is 1 to 50, b is 1 to 50, and c is 1 to 50. In some embodiments, a plus c equals 2 to 10. In some embodiments, a is 1 to 20. In some embodiments, b is 1 to 10, and c is 1 to 10.

Polyetheramines disclosed herein may have a molecular weight of up to about 500,000 Daltons. The polyetheramines may have a number average molecular weight of less than about 50,000 Daltons; or less than about 25,000 Daltons; or less than about 10,000 Daltons; or less than 5000 Daltons; or less than about 2500 Daltons. Useful polyetheramines may have a number average molecular weight in the range of from about 1,500 to about 12,000 Daltons; or in the range of from about 1,500 to about 2,500 Daltons.

The polyetheramines disclosed herein may have a density at 25° C. in the range of 0.90 to 1.20 g/ml, or 0.97 to 1.10 g/ml, or 1.02 to 1.10 g/ml.

Suitable polyetheramines include those commercially available from Huntsman Corporation under the trade name JEFFAMINE® polyetheramines. Examples of commercially available polyetheramines include, but are not limited to: JEFFAMINE® ED series polyetheramines, such as JEFFAMINE® HK-511 polyetheramine, JEFFAMINE® ED-600 polyetheramine, JEFFAMINE® ED-900 polyetheramine, and JEFFAMINE® ED-2003 polyetheramine; JEFFAMINE® M series polyetheramines, such as JEFFAMINE® M-600 polyetheramine, JEFFAMINE® M-1000, JEFFAMINE® M-2005 polyetheramine, and JEFFAMINE® M-2070 polyetheramine; and JEFFAMINE® D series polyetheramines, such as JEFFAMINE® D-230 polyetheramine, JEFFAMINE® D-400, JEFFAMINE® D-2000 polyetheramine, and JEFFAMINE® D-4000 polyetheramine.

An additional example of a polyetheramine additive useful in embodiments disclosed herein includes a polyalkylene oxide block copolymer additive. Polyalkylene oxide block copolymer additives disclosed herein may include an ethylene oxide/propylene oxide block copolymers. The ethylene oxide/propylene oxide block copolymer may be, for example, a diblock or a triblock copolymer. In some embodiments, the ethylene oxide/propylene oxide block copolymer is a triblock copolymer comprising a central poly(propylene oxide) block with two poly(ethylene oxide) blocks.

An example of a suitable polyalkylene oxide block copolymer additive includes an ethylene oxide/propylene oxide block copolymer of the following formula:

$$R^1(CH_2CH_2O)_a(CH_2CH(R^2)O)_b(CH_2CH_2O)_cR^3 \quad (IV)$$

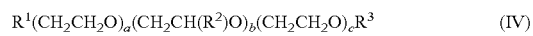

where $R^1$ comprises hydrogen, a hydroxyl group, an alkyl group, or an alkoxy group, $R^2$ comprises an alkyl group, $R^3$ comprises hydrogen, an alkyl group, or a hydroxyl alkyl group, a is 1 to 50, b is 1 to 50, and c is greater than 1. In some embodiments, $R^1$ comprises a hydroxyl group or an alkoxy group, $R^2$ comprises a C1 alkyl group, and $R^3$ comprises hydrogen or an alkyl group.

Suitable ethylene oxide/propylene oxide block copolymers are those available from BASF Corporation under the trade name PLURONIC® surfactants. Examples of commercially available ethylene oxide/propylene oxide block copolymers included for use in embodiments of the present invention include, but are not limited to, PLURONIC® L series, such as PLURONIC® L121 block copolymer.

In addition to the charge characteristics, the polyetheramine additives may adhere to various surfaces, such as metals. Thus, when added to a polymerization reactor, the polyetheramine additives may form a thin film coating the reactor walls and other portions of the reactor, such as the surface of feed lines, recycle lines, and other exposed surfaces in the reactor. Such coatings may prevent sheeting of polymer on such surfaces, and in some embodiments may reverse sheeting that may have previously occurred.

Polyetheramine additives disclosed herein may also be reactive with various oxygenates. Thus, the polyetheramine additives may additionally function as a scavenger for compounds that may poison active catalyst sites. Thus, in contrast to traditional static control agents having hydroxyl groups that may poison catalysts, polyetheramine additives may, for example, enhance catalyst activity by scavenging catalyst poisons, in addition to the static control and reactor coating functions.

The polyetheramine additive may be fed to polymerization reactors as a solution or as a slurry, thus providing an effective transport medium. For example, the polyetheramine additive may be initially admixed or combined with mineral oil, forming a slurry that may be fed to the polymerization reactor. In other embodiments, the polyetheramine additive may be admixed or combined with an aliphatic or aromatic hydrocarbon solvent, prior to being fed to the reactor. The polyetheramine additive may also be added to the reactor in its pure or neat form without any additional admixture component.

In some embodiments, the polyetheramine additive may be admixed with one or more additional continuity additives prior to being fed to the reactor. For example, polyetheramine additive may be admixed with aluminum distearte prior to being fed to the reactor. In some embodiments, the polyetheramine additive and aluminum disterate may be combined with mineral oil to form a slurry prior to being fed to the reactor.

In some embodiments, the polyetheramine additive may be combined/admixed with a polymerization catalyst prior to feeding both to a polymerization reactor. In other embodiments, the polymerization catalyst and the polyetheramine additive may be fed to the polymerization reactor separately. In an embodiment, a combined feed of a polymerization catalyst and a polyetheramine additive may be fed to the reactor in combination with separate addition of the polyetheramine additive to the reactor. When fed to the reactor as a combined feed, such catalyst/polyetheramine additive combinations or mixtures may be formed in a feed vessel or mixed within feed lines during transport to the reactor.

The amount of the polyetheramine additive or additives added to the reactor system may depend upon the catalyst system used, as well as reactor pre-conditioning (such as coatings to control static buildup) and other factors known to those skilled in the art. In some embodiments, the polyetheramine additive may be added to the reactor in an amount ranging from about 0.01 to about 500 parts per million by weight ("ppmw"), based on the polymer production rate (usually expressed as pounds or kilograms polymer per unit of time). The polyetheramine additive may be added to the reactor in an amount ranging from about 0.01 to about 500 ppmw; or from about 0.05 to about 100 ppmw; or from about 1 to about 50 ppmw. The polyetheramine additive may be added to the reactor in an amount of about 2 ppmw or greater, based on the polymer production rate. Other suitable ranges for the polyetheramine additive, based on the polymer production weight include lower limits of greater than or equal to 0.01, 0.02, 0.05, 0.1, 0.5, 1, 2, 3, 4, 5, 10, 12, 15 ppmw and upper limits of less than or equal to 500, 400, 300, 200, 150, 100, 75, 50, 40, 30, 25, 20 ppmw, where the ranges are bounded by any lower and upper limit described above. In some embodiments, a mixture of two or more polyetheramine additives may be used.

The polyetheramine additive may be combined/admixed with the polymerization catalyst composition prior to feeding to the polymerization reactor. The polyetheramine additive may be present in the catalyst composition/system at from about 0.1 to about 25 wt %. Within this range, the polyetheramine additive may be present in the catalyst composition/system at greater than or equal to about 0.5%, or greater than or equal to about 1%, or greater than or equal to about 2%, or greater than or equal to about 3%, or greater than or equal to about 4%, or greater than or equal to about 5%, or greater than or equal to about 6%, or greater than or equal to about 7%, or greater than or equal to about 8%, or greater than or equal to about 9%, or greater than or equal to about 10%, based on the total weight of the catalyst composition. Also within this range, the polyetheramine additive may be present in the catalyst composition/system alternatively at less than or equal to about 20%, or less than or equal to about 15%, or less than or equal to about 10%, based on the total weight of the catalyst composition/system.

The polyetheramine additives may be used as or in a reactor coating emplaced during or prior to conducting polymerization reactions within the reactor. Various methods for use of a continuity additive in reactor coatings or during polymer production are described in WO 2008/108913, WO 2008/108931, WO 2004/029098, U.S. Pat. Nos. 6,335,402, 4,532,311, and U.S. Patent Appl. Pub. No. 2002/026018. For example, at least one of a bed wall, a distributor plate, and a gas recycle line of a polymerization reactor may be contacted with a polyetheramine additive to form a coating thereupon. Formation of the coating prior to conducting polymerization reactions within the reactor may reduce or prevent formation of sheets in the reactor system during subsequent polymerization reactions. Further, such a coating may be sufficient to allow the polymerization reactions to be conducted in the absence of any added continuity additive or static control agents without significant formation of sheets within the reactor. Continuity additives and static control agents may, of course, be fed to the coated reactor, if desired. As used herein "the absence of any added continuity additive or static control agents" means that no continuity additives or static control agents (other than the polyetheramine additives and/or polyalkylene oxide additives that may function as continuity additives or static control agents) have been intentionally added to the reactor, and if present at all are present in the reactor at less than about 0.02 ppmw, or less than about 0.01 ppmw, or less than about 0.005 ppmw, based on the polymer production rate.

The polyetheramine additives may interact with the particles and other components in the fluidized bed, reducing or neutralizing static charges related to frictional interaction of the catalyst and polymer particles, reacting or complexing with various charge-containing compounds that may be present or formed in the reactor, as well as reacting or complexing with oxygenates and other catalyst poisons, as well as coating reactor wall and particles surfaces to reduce adhesion of particles to reactor wall.

Continuity Additives

In addition to the polyetheramine additives described above, it may also be desired to use one or more continuity additives to aid in regulating static levels in the reactor. "Continuity additives" as used herein also include chemical compositions commonly referred to in the art as "static control agents." Due to the enhanced performance of the reactor systems and catalysts that may result via use of a polyetheramine additive as described above, the continuity additives may be used at a lower concentration in polymerization reactors as compared to use of continuity additives alone. Thus, the impact the continuity additives have on catalyst productivity may not be as substantial when used in conjunction with polyetheramine additives according to embodiments disclosed herein.

As used herein, a static control agent is a chemical composition which, when introduced into a fluidized bed reactor, may influence or drive the static charge (negatively, positively, or to zero) in the fluidized bed. The specific static control agent used may depend upon the nature of the static charge, and the choice of static control agent may vary dependent upon the polymer being produced and the catalyst being used. The use of static control agents is disclosed in European Patent No. 0229368 and U.S. Pat. No. 5,283,278.

For example, if the static charge is negative, then static control agents such as positive charge generating compounds may be used. Positive charge generating compounds may include MgO, ZnO, $Al_2O_3$, and CuO, for example. In addition, alcohols, oxygen, and nitric oxide may also be used to control negative static charges. See U.S. Pat. Nos. 4,803,251 and 4,555,370.

For positive static charges, negative charge generating inorganic chemicals such as $V_2O_5$, $SiO_2$, $TiO_2$, and $Fe_2O_3$ may be used. In addition, water or ketones containing up to 7 carbon atoms may be used to reduce a positive charge.

In some embodiments, continuity additives such as aluminum distearate may also be employed. The continuity additive used May be selected for its ability to receive the static charge in the fluidized bed. Suitable continuity additives may also include aluminum distearate, ethoxylated amines, and anti-static compositions such as those provided by Innospec Inc. under the trade name OCTASTAT. For example, OCTASTAT 2000 is a mixture of a polysulfone copolymer, a polymeric polyamine, and oil-soluble sulfonic acid.

Any of the aforementioned continuity additives, as well as those described in, for example, WO 01/44322, listed under the heading Carboxylate Metal Salt and including those chemicals and compositions listed as antistatic agents may be employed either alone or in combination as a continuity additive. For example, the carboxylate metal salt may be combined with an amine containing control agent (e.g., a carboxylate metal salt with any family member belonging to the KEMAMINE (available from Ciba) or ATM ER (available from ICI Americas Inc.) family of products).

Regardless of which continuity additives are used, care should be exercised in selecting an appropriate continuity additive to avoid introduction of poisons into the reactor. In addition, in selected embodiments, the smallest amount of the continuity additives necessary to bring the static charge into alignment with the desired range should be used.

In some embodiments, continuity additives may be added to the reactor as a combination of two or more of the above listed continuity additives, or a combination of a continuity additive and a polyetheramine additive. The continuity additive(s) may be added to the reactor in the form of a solution or a slurry, and may be added to the reactor as an individual feed stream or may be combined with other feeds prior to addition to the reactor. For example, the continuity additive may be combined with the catalyst or catalyst slurry prior to feeding the combined catalyst-static control agent mixture to the reactor.

In some embodiments, the continuity additives may be added to the reactor in an amount ranging from about 0.05 to about 200 ppmw, based on the polymer production rate, or from about 2 to about 100 ppmw, or from about 2 to about 50 ppmw. In other embodiments, the continuity additives may be added to the reactor in an amount of about 2 ppmw or greater, based on the polymer production rate.

In some embodiments, a mixture of a polyetheramine additive and a continuity additive may be fed to the reactor. The weight ratio of the polyetheramine additive to the continuity additive may be from about 95:5 to about 50:50. Other suitable weight ratios of the polyetheramine additive to the continuity additive may include a weight ratio of greater than or equal to about 60:40, about 70:30, about 80:20, or about 90:10.

For example, a mixture of polyethyeramine and aluminum distearate may be used. In some embodiments, the polyetheramine and aluminum distearate additive mixture may be present in the gas phase reactor in the range from about 0.1 to about 500 ppmw, based on the weight of polymer produced in the process.

Polymerization Process

Embodiments for producing polyolefins disclosed herein may employ any suitable process for the polymerization of olefins, including any suspension, solution, slurry, or gas phase process, using known equipment and reaction conditions, and are not limited to any specific type of polymerization system.

In general, the polymerization process may be a continuous gas phase process, such as a fluid bed process. A fluid bed reactor for use in the process of the present invention typically has a reaction zone and a so-called velocity reduction zone (disengagement zone). The reaction zone includes a bed of growing polymer particles, formed polymer particles and a minor amount of catalyst particles fluidized by the continuous flow of the gaseous monomer and diluent to remove heat of polymerization through the reaction zone. Optionally, some of the recirculated gases may be cooled and compressed to form liquids that increase the heat removal capacity of the circulating gas stream when readmitted to the reaction zone. A suitable rate of gas flow may be readily determined by simple experiment. Makeup of gaseous monomer to the circulating gas stream is at a rate equal to the rate at which particulate polymer product and monomer associated therewith is withdrawn from the reactor, and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may be removed in a cyclone and/or fine filter. The gas is passed through a heat exchanger wherein the heat of polymerization is removed, compressed in a compressor and then returned to the reaction zone.

Useful gas phase polymerization processes include those that utilize a fluidized bed reactor. This type reactor, and means for operating the reactor, arc well known and are described in, for example, U.S. Pat. Nos. 3,709,853; 4,003,712; 4,011,382; 4,302,566; 4,543,399; 4,882,400; 5,352,749; 5,541,270; EP-A-0 802 202.

The process described herein is suitable for the production of homopolymers of olefins, including ethylene, and/or copolymers, terpolymers, and the like, of olefins, including polymers comprising ethylene and at least one or more other olefins. The olefins may be alpha-olefins. The olefins, for example, may contain from 2 to 16 carbon atoms, or from 3 to 12 carbon atoms, or from 4 to 10 carbon atoms, or from 4 to 8 carbon atoms.

In some embodiments, polyethylene may be prepared by the process disclosed herein. Such polyethylene may include homopolymers of ethylene and interpolymers of ethylene and at least one alpha-olefin wherein the ethylene content is at least about 50% by weight of the total monomers involved. Olefins that may be used herein include ethylene, propylene, 1-butene, 1-pentene, 1-hexene, 1-heptene, 1-octene, 4-methyl pent-1-ene, 1-decene, 1-dodecene, 1-hexadecene and the like. Also usable are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene, and olefins formed in situ in the polymerization medium. When olefins are formed in situ in the polymerization medium, the formation of polyolefins containing long chain branching may occur.

The content of the alpha-olefin incorporated into the copolymer may be no greater than 30 mol % in total, or may be from 3 to 20 mol %. The term "polyethylene" when used herein is used generically to refer to any or all of the polymers comprising ethylene described above.

In other embodiments, propylene-based polymers may be prepared by processes disclosed herein. Such propylene-based polymers may include homopolymers of propylene and interpolymers of propylene and at least one alpha-olefin wherein the propylene content is at least about 50% by weight of the total monomers involved. Comonomers that may be used may include ethylene, 1-butene, 1-pentene, 1-hexene, 1-heptene, 1-octene, 4-methylpentene-1,1-decene, 1-dodecene, 1-hexadecene and the like. Also usable are polyenes such as 1,3-hexadiene, 1,4-hexadiene, cyclopentadiene, dicyclopentadiene, 4-vinylcyclohexene-1, 1,5-cyclooctadiene, 5-vinylidene-2-norbornene and 5-vinyl-2-norbornene, and olefins formed in situ in the polymerization medium. When olefins are formed in situ in the polymerization medium, the formation of polyolefins containing long chain branching may occur. In one embodiment, the content of the alpha-olefin comonomer incorporated into a propylene-based polymer may be no greater than 49 mol % in total, from 3 to 35 mol % in other embodiments.

Hydrogen gas is often used in olefin polymerization to control the final properties of the polyolefin. Increasing the concentration (partial pressure) of hydrogen may increase the melt flow index (MFI) and/or melt index (MI) of the polyolefin generated. The MEI or MI can thus be influenced by the hydrogen concentration. The amount of hydrogen in the polymerization can be expressed as a mole ratio relative to the total polymerizable monomer, for example, ethylene, or a blend of ethylene and hexene or propylene. The amount of hydrogen used in the polymerization processes of the present invention is an amount necessary to achieve the desired MFI or MI of the final polyolefin resin. Melt flow rate for polypropylene may be measured according to ASTM D 1238 (230° C. with 2.16 kg weight); melt index ($I_2$) for polyethylene may be measured according to ASTM D 1238 (190° C. with 2.16 kg weight).

Other gas phase processes contemplated include series or multistage polymerization processes. For example, a staged reactor employing two or more reactors in series may be used, wherein one reactor may produce, for example, a high molecular weight component and another reactor may produce a low molecular weight component. In some embodiments, the polyolefin is produced using a staged gas phase reactor. Such polymerization systems are described in, for example, U.S. Pat. Nos. 5,627,242; 5,665,818; and 5,677,375; and European publications EP-A-0 794 200; EP-B1-0 649 992, EP-A-0 802 202 and EP-B-634 421.

In some embodiments, the one or more reactors in a gas phase or fluidized bed polymerization process may have a pressure ranging from about 0.7 to about 70 bar (about 10 to about 1000 psia), or from about 14 to about 42 bar (about 200 to about 600 psia). The one or more reactors may have a temperature ranging from about 10° C. to about 150° C., or from about 40° C. to about 125° C. The reactor temperature may be operated at the highest feasible temperature taking into account the sintering temperature of the polymer within the reactor. In some embodiments, the superficial gas velocity in the one or more reactors may range from about 0.2 to about 1.1 meters/second (about 0.7 to about 3.5 feet/second), or from about 0.3 to about 0.8 meters/second (about 1.0 to about 2.7 feet/second).

The polyetheramine additives of this disclosure may be useful with gas phase polymerization systems, at superatmospheric pressures in the range from 0.07 to 68.9 bar (1 to 1000 psig), or from 3.45 to 27.6 bar (50 to 400 psig), or from 6.89 to 24.1 bar (100 to 350 psig), and temperatures in the range from 30 to 130° C., or from 65 to 110° C., or from 75 to 120° C., or from 80 to 120° C. In some embodiments, operating temperatures may be less than 112° C.

The polymerization process may be a continuous gas phase process that includes the steps of: (a) introducing a recycle stream (including ethylene and alpha olefin monomers) into the reactor; (b) introducing the supported catalyst system; (c) withdrawing the recycle stream from the reactor; (d) cooling the recycle stream; (e) introducing into the reactor additional monomer(s) to replace the monomer(s) polymerized; (f) reintroducing the recycle stream or a portion thereof into the reactor; and (g) withdrawing a polymer product from the reactor.

In some embodiments, one or more olefins, $C_2$ to $C_{30}$ olefins or alpha-olefins, including ethylene or propylene or combinations thereof, may be prepolymerized in the presence of a metallocene catalyst systems prior to the main polymerization. The prepolymerization may be carried out batch-wise or continuously in gas, solution or slurry phase, including at elevated pressures. The prepolymerization can take place with any olefin monomer or combination and/or in the presence of any molecular weight controlling agent such as hydrogen. For examples of prepolymerization procedures, see U.S. Pat. Nos. 4,748,221, 4,789,359, 4,923,833, 4,921,825, 5,283,278 and 5,705,578 and European publication EP-B-0279 863 and WO 97/44371.

Any type of polymerization catalyst may be used, including liquid-form catalysts, solid catalysts, and heterogeneous or supported catalysts, among others, and may be fed to the reactor as a liquid, slurry (liquid/solid mixture), or as a solid (typically gas transported). Liquid-form catalysts useful in embodiments disclosed herein should be stable and sprayable or atomizable. These catalysts may be used alone or in various combinations or mixtures. For example, one or more liquid catalysts, one or more solid catalysts, one or more supported catalysts, or a mixture of a liquid catalyst and/or a solid or supported catalyst, or a mixture of solid and supported catalysts may be used. These catalysts may be used with co-catalysts, activators, and/or promoters well known in the art. Examples of suitable catalysts include:

A. Ziegler-Natta catalysts, including titanium-based catalysts, such as those described in U.S. Pat. Nos. 4,376,062 and 4,379,758. Ziegler-Natta catalysts are well known in the art, and typically are magnesium/titanium/electron donor complexes used in conjunction with an organoaluminum co-catalyst.

B. Chromium-based catalysts, such as those described in U.S. Pat. Nos. 3,709,853; 3,709,954; and 4,077,904.

C. Vanadium-based catalysts, such as vanadium oxychloride and vanadium acetylacetonate, such as described in U.S. Pat. No. 5,317,036.

D. Metallocene catalysts, such as those described in U.S. Pat. Nos. 6,933,258 and 6,894,131.

E. Cationic forms of metal halides, such as aluminum trihalides.

F. Cobalt catalysts and mixtures thereof, such as those described in U.S. Pat. Nos. 4,472,559 and 4,182,814.
G. Nickel catalysts and mixtures thereof, such as those described in U.S. Pat. Nos. 4,155,880 and 4,102,817.
H. Rare Earth metal catalysts, i.e., those containing a metal having an atomic number in the Periodic Table of 57 to 103, such as compounds of cerium, lanthanum, praseodymium, gadolinium and neodymium. Especially useful are carboxylates, alcoholates, acetylacetonates, halides (including ether and alcohol complexes of neodymium trichloride), and allyl derivatives of such metals. In various embodiments, neodymium compounds, particularly neodymium neodecanoate, octanoate, and versatate, are particularly useful rare earth metal catalysts. Rare earth catalysts may be used, for example, to polymerize butadiene or isoprene.
I. Any combination of one or more of the catalysts of the above.

Examples of suitable Ziegler-Natta catalyst compounds are disclosed in ZIEGLER CATALYSTS 363-386 (G. Fink, R. Mulhaupt and H. H. Brintzinger, eds., Springer-Verlag 1995); or in EP 103 120; EP 102 503; EP 0 231 102; EP 0 703 246; RE 33,683; U.S. Pat. Nos. 4,302,565; 5,518,973; 5,525, 678; 5,288,933; 5,290,745; 5,093,415 and 6,562,905. Examples of such catalysts include those having Group 4, 5 or 6 transition metal oxides, alkoxides and halides, or oxides, alkoxides and halide compounds of titanium, zirconium or vanadium; optionally in combination with a magnesium compound, internal and/or external electron donors (alcohols, ethers, siloxanes, etc.), aluminum or boron alkyl and alkyl halides, and inorganic oxide supports.

Conventional-type transition metal catalysts can be used. Conventional type transition metal catalysts include traditional Ziegler-Natta catalysts in U.S. Pat. Nos. 4,115,639, 4,077,904, 4,482,687, 4,564,605, 4,721,763, 4,879,359 and 4,960,741. Conventional-type transition metal catalysts can be represented by the formula: MRx, where M is a metal from Groups 3 to 17, or a metal from Groups 4 to 6, or a metal from Group 4, or titanium; R is a halogen or a hydrocarbyloxy group; and x is the valence of the metal M. Examples of R include alkoxy, phenoxy, bromide, chloride and fluoride. Preferred conventional-type transition metal catalyst compounds include transition metal compounds from Groups 3 to 17, or Groups 4 to 12, or Groups 4 to 6.

Conventional-type transition metal catalyst compounds based on magnesium/titanium electron-donor complexes are described in, for example, U.S. Pat. Nos. 4,302,565 and 4,302,566. Catalysts derived from Mg/Ti/Cl/THF are also contemplated.

Suitable chromium catalysts include di-substituted chromates, such as $CrO2(OR)_2$; where R is triphenylsilane or a tertiary polyalicyclic alkyl. The chromium catalyst system can further include $CrO_3$, chromocene, silyl chromate, chromyl chloride ($CrO_2Cl_2$), chromium-2-ethyl-hexanoate, chromium acetylacetonate ($Cr(AcAc)_3$), and the like. Illustrative chromium catalysts are further described in U.S. Pat. Nos. 3,231,550; 3,242,099; and 4,077,904.

Metallocenes are generally described throughout in, for example, 1 & 2 METALLOCENE-BASED POLYOLEFINS (John Scheirs & W. Kaminsky eds., John Wiley & Sons, Ltd. 2000); G. G. Hlatky in 181 COORDINATION CHEM. REV. 243-296 (1999) and in particular, for use in the synthesis of polyethylene in 1 METALLOCENE-BASED POLYOLEFINS 261-377 (2000). The metallocene catalyst compounds can include "half sandwich" and "full sandwich" compounds having one or more Cp ligands (cyclopentadienyl and ligands isolobal to cyclopentadienyl) bound to at least one Group 3 to Group 12 metal atom, and one or more leaving group(s) bound to the at least one metal atom. Hereinafter, these compounds will be referred to as "metallocenes" or "metallocene catalyst components."

The Cp ligands are one or more rings or ring system(s), at least a portion of which includes π-bonded systems, such as cycloalkadienyl ligands and heterocyclic analogues. The ring(s) or ring system(s) typically include atoms selected from Groups 13 to 16 atoms, or the atoms that make up the Cp ligands can be selected from carbon, nitrogen, oxygen, silicon, sulfur, phosphorous, germanium, boron and aluminum and combinations thereof, wherein carbon makes up at least 50% of the ring members. Or, the Cp ligand(s) can be selected from substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno [1,2-9]anthrene, thiophenoindenyl, thiophenofluorenyl, hydrogenated versions thereof (e.g., 4,5,6,7-tetrahydroindenyl, or "$H_4Ind$"), substituted versions thereof, and heterocyclic versions thereof.

For example, a metallocene catalyst represented by Formula (I) may be used:

$$Cp^A Cp^B MX_n \qquad (I)$$

The metal atom "M" of the metallocene catalyst compound may be selected from Groups 3 through 12 atoms and lanthanide Group atoms, or may be selected from Groups 4, 5 and 6 atoms; or may be selected from Ti, Zr, or Hf atoms; and may be Zr in some particular embodiments. The groups bound the metal atom "M" is such that the compounds described below in the formulas and structures are neutral, unless otherwise indicated. The Cp ligand(s) form at least one chemical bond with the metal atom M to form the "metallocene catalyst compound". The Cp ligands are distinct from the leaving groups bound to the catalyst compound in that they are not highly susceptible to substitution/abstraction reactions.

In Formula (I), M may be as described above and each X is chemically bonded to M; each Cp group is chemically bonded to M; and n is 0 or an integer from 1 to 4, or is either 1 or 2.

The ligands represented by $Cp^A$ and $Cp^B$ in formula (I) may be the same or different cyclopentadienyl ligands or ligands isolobal to cyclopentadienyl, either or both of which may contain heteroatoms and either or both of which may be substituted by a group R. $Cp^A$ and $Cp^B$ may be independently selected from cyclopentadienyl, indenyl, tetrahydroindenyl, fluorenyl, and substituted derivatives of each.

Independently, each $Cp^A$ and $Cp^B$ of formula (I) may be unsubstituted or substituted with any one or combination of substituent groups R. Non-limiting examples of substituent groups R as used in Formula (I) include hydrogen radicals, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof.

More particular non-limiting examples of alkyl substituents R associated with Formula (I) includes methyl, ethyl, propyl, butyl, pentyl, hexyl, cyclopentyl, cyclohexyl, benzyl, phenyl, methylphenyl, and tert-butylphenyl groups and the like, including all their isomers, for example tertiary-butyl, isopropyl, and the like. Other possible radicals include substituted alkyls and aryls such as, for example, fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methylbis(difluoromethyl)silyl, bromomethyldimethylgermyl and the like; and disubstituted boron radicals including dimethylboron for example; and disubstituted Group 15 radicals including dimethylamine, dimethylphosphine, diphenylamine, methylphenylphosphine, Group 16 radicals including methoxy, ethoxy, propoxy, phenoxy, methylsulfide and ethylsulfide. Other substituents R include olefins such as but not limited to olefinically unsaturated substituents including vinyl-terminated ligands, for example 3-butenyl, 2-propenyl, 5-hexenyl and the like. In some embodiments, at least two R groups, such as two adjacent R groups, are joined to form a ring structure having from 3 to 30 atoms selected from the carbon, nitrogen, oxygen, phosphorous, silicon, germanium, aluminum, boron, and combinations thereof. Also, a substituent group R group such as 1-butanyl may form a bonding association to the element M.

Each X in Formula (I) may be independently selected from halogen ions, hydrides, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. In some embodiments, X is selected from $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof; or X is selected from hydride, halogen ions. $C_1$ to $C_6$ alkyls, $C_2$ to $C_6$ alkenyls, $C_7$ to $C_{18}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls; or X is selected from hydride, chloride, fluoride, methyl, phenyl, phenoxy, benzoxy, tosyl, fluoromethyls, and fluorophenyls; or X is selected from $C_1$ to $C_{12}$, alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls, and $C_1$ to $C_{12}$ heteroatom-containing alkylaryls; or X is selected from chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls; or X is selected from fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls).

The metallocene catalyst compound and/or component may include those of Formula (I) where $Cp^A$ and $Cp^B$ are bridged to each other by at least one bridging group, (A), such that the structure is represented by Formula (II):

$$Cp^A(A)Cp^B MX_n \qquad (II)$$

These bridged compounds represented by formula (II) are known as "bridged metallocenes." $Cp^A$, $Cp^B$, M, X and n are as defined above for Formula (I); and wherein each Cp ligand is chemically bonded to M, and (A) is chemically bonded to each Cp. Non-limiting examples of bridging group (A) include divalent alkyls, divalent lower alkyls, divalent substituted alkyls, divalent heteroalkyls, divalent alkenyls, divalent lower alkenyls, divalent substituted alkenyls, divalent heteroalkenyls, divalent alkynyls, divalent lower alkynyls, divalent substituted alkynyls, divalent heteroalkynyls, divalent alkoxys, divalent lower alkoxys, divalent aryloxys, divalent alkylthios, divalent lower alkyl thios, divalent arylthios, divalent aryls, divalent substituted aryls, divalent heteroaryls, divalent aralkyls, divalent aralkylenes, divalent alkaryls, divalent alkarylenes, divalent haloalkyls, divalent haloalkenyls, divalent haloalkynyls, divalent heteroalkyls, divalent heterocycles, divalent heteroaryls, divalent heteroatom-containing groups, divalent hydrocarbyls, divalent lower hydrocarbyls, divalent substituted hydrocarbyls, divalent heterohydrocarbyls, divalent silyls, divalent boryls, divalent phosphinos, divalent phosphines, divalent aminos, divalent amities, divalent ethers, divalent thioethers. Additional non-limiting examples of bridging group A include divalent hydrocarbon groups containing at least one Group 13 to 16 atom, such as but not limited to at least one of a carbon, oxygen, nitrogen, silicon, aluminum, boron, germanium and tin atom and combinations thereof; wherein the heteroatom may also be $C_1$ to $C_{12}$ alkyl or aryl substituted to satisfy neutral valency. The bridging group (A) may also contain substituent groups R as defined above for formula (I) including halogen radicals and iron. More particular non-limiting examples of bridging group (A) are represented by $C_1$ to $C_6$ alkylenes, substituted $C_1$ to $C_6$ alkylenes, oxygen, sulfur, $R_2'C=$, $R_2'Si=$, $—Si(R')_2Si(R_2')—$, $R_2'Ge=$, $R'P=$ (wherein "$=$" represents two chemical bonds), where R' is independently selected from the hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more R' may be joined to form a ring or ring system. In some embodiments, the bridged metallocene catalyst component of Formula (II) has two or more bridging groups (A).

Other non-limiting examples of bridging group (A) include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties wherein the Si atom is replaced by a Ge or a C atom; dimethylsilyl, diethylsilyl, dimethylgermyl and diethylgermyl.

In Formula (II), bridging group (A) may also be cyclic, comprising, for example 4 to 10 ring members, or 5 to 7 ring members. The ring members may be selected from the elements mentioned above, or from one or more of B, C, Si, Ge, N and O. Non-limiting examples of ring structures which may be present as or part of the bridging moiety are cyclobutylidene, cyclopentylidene, cyclohexylidene, cycloheptylidene, cyclooctylidene and the corresponding rings where one or two carbon atoms are replaced by at least one of Si, Ge, N and O, in particular, Si and Ge. The bonding arrangement between the ring and the Cp groups may be either cis-, trans-, or a combination.

The cyclic bridging groups (A) may be saturated or unsaturated and/or carry one or more substituents and/or be fused to one or more other ring structures. If present, the one or more substituents are selected from the hydrocarbyl (e.g., alkyl such as methyl) and halogen (e.g., F, Cl) in one embodiment. The one or more Cp groups which the above cyclic bridging moieties may optionally be fused to may be saturated or unsaturated and are selected from those having 4 to 10, more particularly 5, 6 or 7 ring members (selected from C, N, O and S in a particular embodiment) such as, for example, cyclopentyl, cyclohexyl and phenyl. Moreover, these ring structures may themselves be fused such as, for example, in the case of a naphthyl group. Moreover, these (optionally fused) ring structures may carry one or more substituents. Illustrative, non-limiting examples of these substituents are hydrocarbyl (particularly alkyl) groups and halogen atoms.

The ligands $Cp^A$ and $Cp^B$ of formula (I) and (II) are different from each other in some embodiments, and the same as one another in other embodiments.

The metallocene catalyst components may include monoligand metallocene compounds (e.g., mono cyclopentadienyl catalyst components), such as those described in WO 93/08221 for example.

In yet another aspect, the at least one metallocene catalyst component is an unbridged "half sandwich" metallocene represented by the formula (III):

$$Cp^A MQ_q X_n \quad\quad (III)$$

wherein $Cp^A$ is defined as for the Cp groups in Formula (I) and is a ligand that is bonded to M; each Q is independently bonded to M; Q is also bound to $Cp^A$; X is a leaving group as described above in Formula (I); n ranges from 0 to 3, and is 1 or 2; q ranges from 0 to 3, or is 1 or 2. In some embodiments, $Cp^A$ is selected from cyclopentadienyl, indenyl, tetrahydroindenyl, fluorenyl, substituted version thereof, and combinations thereof.

In Formula (III), Q is selected from $ROO^-$, $RO$—, $R(O)$—, —NR—, —S—, $-NR_2$, $-CR_3$, —SR, $-SiR_3$, $-PR_2$, —H, and substituted and unsubstituted aryl groups, wherein R is selected from hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbam-oyls, acyloxys, acylaminos, aroylaminos, and combinations thereof. In some embodiments, R is selected from $C_1$ to $C_6$ alkyls, $C_6$ to $C_{12}$ aryls, $C_1$ to $C_6$ alkylamines, $C_6$ to $C_{12}$ alkylarylamines, $C_1$ to $C_6$ alkoxys, $C_6$ to $C_{12}$ aryloxys, and the like. Non-limiting examples of Q include $C_1$ to $C_{12}$ carbamates, $C_1$ to $C_{12}$ carboxylates (e.g., pivalate), $C_2$ to $C_{20}$ allyls, and $C_2$ to $C_{20}$ heteroallyl moieties.

Described another way, the "half sandwich" metallocenes above can be described as in Formula (IV), such as described in, for example, U.S. Pat. No. 6,069,213:

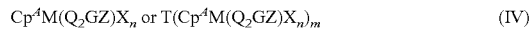

$$Cp^A M(Q_2 GZ)X_n \text{ or } T(Cp^A M(Q_2 GZ)X_n)_m \quad\quad (IV)$$

wherein M, $Cp^A$, X and n are as defined above; $Q_2 GZ$ forms a polydentate ligand unit (e.g., pivalate), wherein at least one of the Q groups form a bond with M, and is defined such that each Q is independently selected from —O—, —NR—, $-CR_2$— and —S—; G is either carbon or silicon; and Z is selected from R, —OR, $-NR_2$, $-CR_3$, —SR, $-SiR_3$, $-PR_2$, and hydride, providing that when Q is —NR—, then Z is selected from —OR, $-NR_2$, —SR, $-SiR_3$, $-PR_2$; and provided that neutral valency for Q is satisfied by Z; and wherein each R is independently selected from hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. In some embodiments, R is selected from $C_1$ to $C_{10}$ heteroatom containing groups, $C_1$ to $C_{10}$ alkyls, $C_6$ to $C_{12}$ aryls, $C_6$ to $C_{12}$ alkylaryls, $C_1$ to $C_{10}$ alkoxys, and $C_6$ to $C_{12}$ aryloxys; n is 1 or 2; T is a bridging group selected from $C_1$ to $C_{10}$ alkylenes, $C_6$ to $C_{17}$ arylenes and $C_1$ to $C_{10}$ heteroatom containing groups, and $C_6$ to $C_{12}$ heterocyclic groups; wherein each T group bridges adjacent "$Cp^A M(Q_2 GZ)X_n$" groups, and is chemically bonded to the $Cp^A$ groups; m is an integer from 1 to 7, or is an integer from 2 to 6.

A as described above for (A) in Formula (II), may be selected from a chemical bond, —O—, —S—, $-SO_2$—, —NR—, $=SiR_2$, $=GeR_2$, $=SnR_2$, $-R_2 SiSiR$, $RP=$, $C_1$ to $C_{12}$ alkylenes, substituted $C_1$ to $C_{12}$ alkylenes, divalent $C_4$ to $C_{12}$ cyclic hydrocarbons and substituted and unsubstituted aryl groups; or is selected from $C_5$ to $C_8$ cyclic hydrocarbons, $-CH_2 CH_2$—, $=CR_2$ and $=SiR_2$. R may be selected from alkyls, cycloalkyls, aryls, alkoxys, fluoroalkyls and heteroatom-containing hydrocarbons; or is selected from $C_1$ to $C_6$ alkyls, substituted phenyls, phenyl, and $C_1$ to $C_6$ alkoxys; or is selected from methoxy, methyl, phenoxy, and phenyl. In some embodiments, A may be absent, in which case each R* is defined as for $R^1$-$R^{13}$; each X is as described above in Formula (I); n is an integer from 0 to 4, or from 1 to 3 or is 1 or 2; and $R^1$ through $R^{13}$ are independently selected from hydrogen radicals, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, aroylaminos; or $R^1$ through $R^{13}$ may also be selected independently from $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_1$ to $C_{12}$ fluoroalkyls, $C_6$ to $C_{12}$ fluoroaryls, and $C_1$ to $C_{12}$ heteroatom-containing hydrocarbons and substituted derivatives; or may be selected from hydrogen radical, fluorine radical, chlorine radical, bromine radical, $C_1$ to $C_6$ alkyls, $C_2$ to $C_6$ alkenyls, $C_7$ to $C_{18}$ alkylaryls, $C_1$ to $C_6$ fluoroalkyls, $C_2$ to $C_6$ fluoroalkenyls, $C_7$ to $C_{18}$ fluoroalkylaryls; or may be selected from hydrogen radical, fluorine radical, chlorine radical, methyl, ethyl, propyl, isopropyl, butyl, isobutyl, tertiary butyl, hexyl, phenyl, 2,6-di-methylpheyl, and 4-tertiarybutylpheyl groups; wherein adjacent R groups may form a ring, either saturated, partially saturated, or completely saturated.

It is contemplated that the metallocene catalysts components described above include their structural or optical or enantiomeric isomers (racemic mixture), and may be a pure enantiomer in one embodiment.

As used herein, a single, bridged, asymmetrically substituted metallocene catalyst component having a racemic and/or meso isomer does not, itself, constitute at least two different bridged, metallocene catalyst components.

The "metallocene catalyst compound", also referred to herein as the metallocene catalyst component" may comprise any combination of any "embodiment" described herein.

Other suitable metallocenes include but are not limited to those described in U.S. Pat. Nos. 7,179,876, 7,169,864, 7,157,531, 7,129,302, 6,995,109, 6,958,306, 6,884748, 6,689,847, 6,309,997, 6,265,338, U.S. Pat. App. Pub. No. 2007/0055028, and U.S. Pat. App. Pub. No. 2006/019925, and published PCT App. Nos. WO 97/22635, WO 00/699/22, WO 01/30860, WO 01/30861, WO 02/46246, WO 02/50088, WO 04/026921, WO 06/019494, and WO 2010/039948.

In some embodiments, a "mixed" catalyst system or "multi-catalyst" system may be used. A mixed catalyst system includes at least one metallocene catalyst component and at least one non-metallocene component. The mixed catalyst system may be described as a bimetallic catalyst composition or a multi-catalyst composition. As used herein, the terms "bimetallic catalyst composition" and "bimetallic catalyst" include any composition, mixture, or system that includes two or more different catalyst components, each having the same or different metal group but having at least one different catalyst component, for example, a different ligand or general catalyst structure. Examples of useful bimetallic catalysts can be found in U.S. Pat. Nos. 6,271,325, 6,300,438, and 6,417,304. The terms "multi-catalyst composition" and "multi-catalyst" include any composition, mixture, or system that includes two or more different catalyst components regardless of the metals. Therefore, terms "bimetallic catalyst composition," "bimetallic catalyst," "multi-catalyst composition," and "multi-catalyst" will be collectively referred to herein as a "mixed catalyst system" unless specifically noted otherwise.

The described catalyst compounds may also be combined with one or more support materials or carriers. For example, in some embodiments, the activator is contacted with a support to form a supported activator wherein the activator is deposited on, contacted with, vaporized with, bonded to, or incorporated within, adsorbed or absorbed in, or on, a support or carrier.

Support materials may include inorganic or organic support materials, such as a porous support material. Non-limiting examples of inorganic support materials include inorganic oxides and inorganic chlorides. Other carriers include resinous support materials such as polystyrene, functionalized or crosslinked organic supports, such as polystyrene divinyl benzene, polyolefins or polymeric compounds, or any other organic or inorganic support material and the like, or mixtures thereof.

The support materials may include inorganic oxides including Group 2, 3, 4, 5, 13 or 14 metal oxides, such as silica, fumed silica, alumina, silica-alumina and mixtures thereof. Other useful supports include magnesia, titania, zirconia, magnesium chloride, montmorillonite, phyllosilicate, zeolites, talc, clays, and the like. Also, combinations of these support materials may be used, for example, silica-chromium, silica-alumina, silica-titania and the like. Additional support materials may include those porous acrylic polymers described in EP 0 767 184. Other support materials include nanocomposites, as described in PCT WO 99/47598, aerogels, as described in WO 99/48605, spherulites, as described in U.S. Pat. No. 5,972,510, and polymeric beads, as described in WO 99/50311.

Support material, such as inorganic oxides, may have a surface area in the range from about 10 to about 700 $m^2/g$, a pore volume in the range from about 0.1 to about 4 cc/g, and an average particle size in the range from about 0.1 to about 1000 µm. In some embodiments, the surface area of the support may be in the range from about 50 to about 500 $m^2/g$, pore volume is from about 0.5 to about 3.5 cc/g, and the average particle size is from about 1 to about 500 µm. In some embodiments, the surface area of the support is in the range from about 100 to about 1000 $m^2/g$, the pore volume is from about 0.8 to about 5.0 cc/g, and the average particle size is from about 1 to about 100 µm, or from about 1 to about 60 µm. The average pore size of the support material may be in the range from 10 to 1000 Å; or from about 50 to about 500 Å; or from about 75 to about 450 Å.

There are various methods known in the art for producing a supported activator or combining an activator with a support material. In some embodiments, the support material is chemically treated and/or dehydrated prior to combining with the catalyst compound, activator and/or catalyst system. In some embodimentss, the support material may have various levels of dehydration, such as may be achieved by drying the support material at temperatures in the range from about 100° C. to about 1000° C.

In some embodiments, dehydrated silica may be contacted with an organoaluminum or alumoxane compound. In specifically the embodiment wherein an organoaluminum compound is used, the activator is formed in situ in the support material as a result of the reaction of, for example, trimethylaluminum and water.

The supported activator is formed by preparing, in an agitated, temperature and pressure controlled vessel, a solution of the activator and a suitable solvent, then adding the support material at temperatures from 0° C. to 100° C., contacting the support with the activator solution, then using a combination of heat and pressure to remove the solvent to produce a free flowing powder. Temperatures can range from 40 to 120° C. and pressures from 5 psia to 20 psia (34.5 to 138 kPa). An inert gas sweep can also be used in assist in removing solvent.

Alternate orders of addition, such as slurrying the support material in an appropriate solvent then adding the activator, can be used.

The weight percent of the activator to the support material may be in the range of from about 10 weight percent to about 70 weight percent, or in the range from about 15 weight percent to about 60 weight percent, or in the range from about 20 weight percent to about 50 weight percent, or in the range from about 20 weight percent to about 40 weight percent.

Conventional supported catalysts system useful in embodiments disclosed herein include those supported catalyst systems that are formed by contacting a support material, an activator and a catalyst compound in various ways under a variety of conditions outside of a catalyst feeder apparatus. Examples of conventional methods of supporting metallocene catalyst systems are described in U.S. Pat. Nos. 4,701,432, 4,808,561, 4,912,075, 4,925,821, 4,937,217, 5,008,228, 5,238,892, 5,240,894, 5,332,706, 5,346,925, 5,422,325, 5,466,649, 5,466,766, 5,468,702, 5,529,965, 5,554,704, 5,629,253, 5,639,835, 5,625,015, 5,643,847, 5,665,665, 5,698,487, 5,714,424, 5,723,400, 5,723,402, 5,731,261, 5,759,940, 5,767,032, 5,770,664, 5,846,895, 5,939,348, 546,872, 6,090,740 and PCT publications WO 95/32995, WO 95/14044, WO 96/06187 and WO 97/02297, and EP-B1-0 685 494.

The catalyst components, for example a catalyst compound, activator and support, may be fed into the polymerization reactor as a mineral oil slurry. Solids concentrations in oil may range from about 1 to about 50 weight percent, or from about 10 to about 25 weight percent.

The catalyst compounds, activators and or optional supports used herein may also be spray dried separately or together prior to being injected into the reactor. The spray dried catalyst may be used as a powder or solid or may be placed in a diluent and slurried into the reactor. In other embodiments, the catalyst compounds and activators used herein are not supported.

Processes disclosed herein may optionally use inert particulate materials as fluidization aids. These inert particulate materials can include carbon black, silica, talc, and clays, as well as inert polymeric materials. Carbon black, for example, has a primary particle size of about 10 to about 100 nanometers, an average size of aggregate of about 0.1 to about 30 microns, and a specific surface area from about 30 to about 1500 $m^2$/g. Silica has a primary particle size of about 5 to about 50 nanometers, an average size of aggregate of about 0.1 to about 30 microns, and a specific surface area from about 50 to about 500 $m^2$/g. Clay, talc, and polymeric materials have an average particle size of about 0.01 to about 10 microns and a specific surface area of about 3 to 30 $m^2$/g. These inert particulate materials may be used in amounts ranging from about 0.3 to about 80%, or from about 5 to about 50%, based on the weight of the final product. They are especially useful for the polymerization of sticky polymers as disclosed in U.S. Pat. Nos. 4,994,534 and 5,304,588.

Chain transfer agents, promoters, scavenging agents and other additives may be, and often are, used in the polymerization processes disclosed herein. Chain transfer agents are often used to control polymer molecular weight. Examples of these compounds are hydrogen and metal alkyls of the general formula $M^yR_y$, where M is a Group 3-12 metal, x is the oxidation state of the metal, typically 1, 2, 3, 4, 5 or 6, each R is independently an alkyl or aryl, and y is 0, 1, 2, 3, 4, 5, or 6. In some embodiments, a zinc alkyl is used, such as diethyl zinc. Typical promoters may include halogenated hydrocarbons such as $CHCl_3$, $CFCl_3$, $CH_3$-$CCl_3$, $CF_2Cl$—$CCl_3$, and ethyltrichloroacetate. Such promoters are well known to those skilled in the art and are disclosed in, for example, U.S. Pat. No. 4,988,783. Other organometallic compounds such as scavenging agents for poisons may also be used to increase catalyst activity. Examples of these compounds include metal alkyls, such as aluminum alkyls, for example, triisobutylaluminum. Some compounds may be used to neutralize static in the fluidized-bed reactor, others known as drivers rather than antistatic agents, may consistently force the static from positive to negative or from negative to positive. These additives may be added to the circulation loops, riser, and/or downer separately or independently from the liquid catalyst if they are solids, or as part of the catalyst provided they do not interfere with the desired atomization. To be part of the catalyst solution, the additives should be liquids or capable of being dissolved in the catalyst solution.

In some embodiments, the gas phase process may be operated in the presence of a metallocene-type catalyst system and in the absence of, or essentially free of, any scavengers, such as triethylaluminum, trimethylaluminum, tri-isobutylaluminum and tri-n-hexylaluminum and diethyl aluminum chloride, dibutyl zinc, and the like. By "essentially free," it is meant that these compounds are not deliberately added to the reactor or any reactor components, and if present, are present in the reactor at less than 1 ppm.

The reactors disclosed herein may be capable of producing greater than 500 lbs of polymer per hour (227 kg/hr) to about 300,000 lbs/hr (136,000 kg/hr) or higher of polymer, or preferably greater than 1000 lbs/hr (455 kg/hr), or greater than 10,000 lbs/hr (4540 kg/hr), or greater than 25,000 lbs/hr (11,300 kg/hr), or greater than 35,000 lbs/hr (15,900 kg/hr), or greater than 50,000 lbs/hr (22,700 Kg/hr), or preferably greater than 65,000 lbs/hr (29,000 kg/hr) to greater than 150,000 lbs/hr (68,100 kg/hr).

The polymers produced by the processes described herein can be used in a wide variety of products and end-use applications. The polymers produced may include linear low density polyethylene, elastomers, plastomers, high density polyethylene, medium density polyethylene, low density polyethylene, polypropylene homopolymers and polypropylene copolymers, including random copolymers and impact copolymers.

The polymers, typically ethylene-based polymers, have a density, for example, in the range of from 0.86 g/cc to 0.97 g/cc, or in the range of from 0.88 g/cc to 0.965 g/cc, or in the range of from 0.900 g/cc to 0.96 g/cc. Density is measured in accordance with ASTM-D-1238.

Polymers produced by the processes disclosed herein and blends thereof are useful in such forming operations as film, sheet, and fiber extrusion and co-extrusion as well as blow molding, injection molding and rotary molding. Films include blown or cast films formed by co-extrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications.

Polymerization processes disclosed herein may also be operated in a condensing mode, similar to those disclosed in U.S. Pat. Nos. 4,543,399, 4,588,790, 4,994,534, 5,352,749, 5,462,999, and 6,489,408, and U.S. Patent Appl. Pub. No. 2005/0137364. Condensing mode processes may be used to achieve higher cooling capacities and, hence, higher reactor productivity. In addition to condensable fluids of the polymerization process itself, including monomer(s) and co-monomer(s), other condensable fluids inert to the polymerization may be introduced to induce a condensing mode operation, such as by the processes described in U.S. Pat. No. 5,436,304.

Measurement and Control of Static

The entrainment zone is defined as any area in a reactor system above or below the dense phase zone of the reactor system. Fluidization vessels with a bubbling bed comprise two zones, a dense bubbling phase with an upper surface separating it from a lean or dispersed phase. The portion of the vessel between the (upper) surface of the dense bed and the exiting gas stream (to the recycle system) is called "freeboard." Therefore, the entrainment zone comprises the freeboard, the cycle (recycle) gas system (including piping and compressors/coolers) and the bottom of the reactor up to the top of the distributor plate. Electrostatic activity measured anywhere in the entrainment zone is termed herein "carryover static," and as such, is differentiated from the electrostatic activity measured by a conventional static probe or probes in the fluid bed.

The electrostatic activity (carryover or entrainment static) measured above the "at or near zero" level (as defined herein) on the carryover particles in the entrainment zone may correlate with sheeting, chunking or the onset of same in a polymer reaction system and may be a more reliable indicator of sheeting or a discontinuity event than electrostatic activity measured by one or more "conventional" static probes. In addition, monitoring electrostatic activity of the carryover particles in the entrainment zone may provide reactor parameters by which the amount of polyetheramine additive (e.g., polyetheramine additive, polyalkylene oxide additive, etc.) and continuity additive, if used, can be dynamically adjusted and an optimum level obtained to reduce or eliminate the discontinuity event.

If the level of electrostatic activity in the entrainment zone increases in magnitude during the course of the reaction, the amount of polyetheramine additive in the reactor system may be adjusted accordingly as described further herein.

Static Probes

The static probes described herein as being in the entrainment zone include one or more of: at least one recycle line probe; at least one annular disk probe; at least one distributor plate static probe; or at least one upper reactor static probe, this latter will be outside or above the ¼ to ¾ reactor diameter height above the distributor plate of the conventional probe or probes. These probes may be used to determine entrainment static either individually or with one or more additional probes from each group mentioned above. The type and location of the static probes may be, for example, as described in U.S. Patent Appl. Pub. No. 2005/0148742.

Typical current levels measured with the conventional reactor probes range from ±0.1-10, or ±0.1-8, or ±0.1-6, or ±0.1-4, or ±0.1-2 nanoamps/cm$^2$. As with all current measurements discussed herein, these values will generally be averages over time periods, also these may represent root mean squared values (RMS), in which case they would all be positive values. However, most often, in reactors utilizing metallocene catalysts, the conventional reactor probes will register at or near zero during the beginning of or middle of a sheeting incident. By at or near zero, it is intended for either the conventional static reactor probe as well as the probes in the entrainment zone, to be a value of ≤±0.5, or ≤±0.3, or ≤±0.1, or ≤±0.05, or ≤±0.03, or ≤±0.01, or ≤±0.001 or 0 nanoamps/cm$^2$. For example, a measured value of −0.4 would be "less than" "±0.5," as would a measured value of +0.4. When static is measured with a voltage probe, typical voltage levels measured may range from ±0.1-15,000, or ±0.1-10,000 volts.

The conventional static probe may register at or near zero static or current (as defined herein), while at least one other static probe in at least one location in the entrainment zone, may register static activity or current higher than that measured by the conventional static probe (this latter may most often be at or near zero with metallocene catalyst). In this event, where the difference between the current measured by conventional static probe and the current measured by one or more other (non-conventional static probes) is ≤±0.1, or ≤±0.3, or ≤±0.5 nanoamps/cm$^2$, or greater, action will be taken to reduce or eliminate the static charge in being detected at one or more of the entrainment zone probes. Such action may be addition of a polyetheramine additive (e.g., polyetheramine additive, polyalkylene oxide additive, etc.) according to embodiments disclosed herein (or a net increase in the presence in the reactor of a polyetheramine additive according to embodiments disclosed herein), or a reduction in the catalyst feed rate, or a reduction in the gas throughput velocity, or combinations thereof. Additional continuity additives may also be added as discussed herein. These actions constitute means for maintaining, reducing or eliminating carryover static and reactor static at or near zero.

When one or more of the static probes discussed above begin to register static activity above or below zero, (defined as being respectively above or below "at or near zero") measures should be taken to keep the level low or to return the level of static activity to at or near zero, which we have shown will prevent, reduce or eliminate reactor continuity events. The measures contemplated include addition of a polyetheramine additive. Such addition may have the effect of raising the level of a polyetheramine additive in the reactor if a certain level is already present.

The total amount of the polyetheramine additive or additives described herein and any continuity additives, if used, present in the reactor will generally not exceed, for example, 500 or 250 or 200, or 150, or 125 or 100 or 90, or 80, or 70 or 60, or 50, or 40, or 30, or 20 or 10 ppmw. The total amount of polyetheramine additive and any continuity additives or static control agents, if used, will be greater than 0.01, or 1, or 3, or 5, or 7, or 10, or 12, or 14, or 15, or 17, or 20 ppmw. Any of these lower limits are combinable with any upper limit given above. The polyetheramine additive may be added directly to the reactor through a dedicated feed line, and/or added to any convenient feed stream, including the ethylene feed stream, the comonomer feed stream, the catalyst feed line, or the recycle line. If more than one polyetheramine additive and continuity additive or static control agent is used, each one may be added to the reactor as separate feed streams, or as any combination of separate feed streams or mixtures. The manner in which the polyetheramine additives are added to the reactor is not important, so long as the additive(s) are well dispersed within the fluidized bed, and that their feed rates (or concentrations) are regulated in a manner to provide minimum levels of carryover static.

The total amount of additive discussed immediately above may include a polyetheramine additive (e.g., polyetheramine additive, polyalkylene oxide additive, etc.) from any source, such as that added with the catalyst, added in a dedicated continuity additive line, contained in any recycle material, or combinations thereof. In some embodiments, a portion of the polyetheramine additive would be added to the reactor as a preventative measure before any measurable electrostatic activity, in such case, when one or more static probes register static activity above the "at or near zero" level, the amount of the polyetheramine additive can be increased to return the one or more probes registering static activity, back to at or near zero.

The polyetheramine additive may be introduced in the catalyst mixture. For example, a catalyst mixture (containing the polyetheramine additive) may be injected into the reactor system, and additionally or alternatively polyetheramine additive may be introduced into the reactor system via a dedicated additive feed line independent of the catalyst mixture, so that a sufficient concentration of the polyetheramine additive is introduced into the reactor to prevent or eliminate a reactor discontinuity event. Either of these feed schemes or both together may be employed. The polyetheramine additive in the catalyst/polyetheramine additive mixture and the polyetheramine additive added via the separate additive feed line, may be the same or different.

In some embodiments, the polyetheramine additives may be added to a non-soluble or anti-solvent component to form a suspension. When added to the reactor, the polyetheramine additive is thereby well dispersed in a high surface area state and may be able to coat the vessel walls and polymer particles more effectively. It is also believed that the particles are more highly charged in this state and more effective as a static driver.

Determination of optimal polyetheramine additive feed rate to the reactor system is evidenced by a value of the static level at or near zero as defined herein. For example, after stabilizing the static level reading in the reactor, if additional (i.e. higher) levels of a polyetheramine additive are added, and if one or more static probes in the entrainment zone of the reactor shows an increase in magnitude of static reading, this is a qualitative indication that the optimum continuity level has been exceeded. In this event, the levels of polyetheramine additive should be lowered until stability of the static activity (as indicated by relatively constant readings of static activity in the one or more static probes) is again achieved, or the static activity is lowered to near zero or regains zero. Thus, dynamically adjusting the amount of the polyetheramine additive to reach an optimum concentration range is desirable and is within the practice of embodiments of the present invention. By optimum concentration we intend herein an effective amount. Therefore, an effective amount of the polyetheramine additive is that amount that reduces, eliminates or achieves stability in electrostatic charge as measured by one or more static probes.

EXAMPLES

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains. Therefore, the following examples are put forth so as to provide those skilled in the art with a complete disclosure and description and are not intended to limit the scope of that which the inventors regard as their invention.

Additives used in the following Examples include:

PA-1 is a polyetheramine additive that is a polyetherdiamine. PA-1 has a number average molecular weight of about 2000 and a melting point of about 43° C. PA-1 has the following structure:

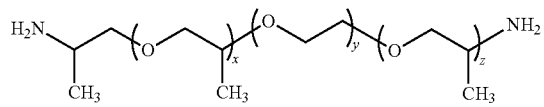

$y=39$, $(x+z)=6$

Suitable PA-1s are available under the tradename JEFFAMINE® ED-2003 available from Huntsman.

MIX-1 is a 75:25 mixture of PA-1 (e.g., JEFFAMINE® ED-200)3 and aluminum distearate.

MIX-2 is a 50:50 mixture of aluminum distearate and an ethoxylated amine type compound (IRGASTAT AS-990, available from Ciba (now part of BASF)).

Catalysts used in the following Examples are as follows:

Catalyst 1 is a silica supported bis(n-propyl-cyclopentadiene)hafniumdimethyl with methylalumoxane; and Catalyst 2 is a bi-metallic catalyst that comprises a (tetramethylcyclopentadiene)(n-propylcyclopentadiene) zirconium dichloride and a bis(2-(pentamethylphenylamido) ethyl)amine zirconium dibenzyl. The catalyst is supported on fumed silica with methylalumoxane. Methods of preparing the catalyst are disclosed in, for example, U.S. Pat. No. 6,271,325.

The polymerization reactions described in the following examples were conducted in a continuous pilot-scale gas phase fluidized bed reactor of 0.35 meters internal diameter and 2.3 meters in bed height. The fluidized bed was made up of polymer granules. The gaseous feed streams of ethylene and hydrogen together with liquid comonomer were introduced below the reactor bed into the recycle gas line. Hexene was used as comonomer. The individual flow rates of ethylene, hydrogen and comonomer were controlled to maintain fixed composition targets. The ethylene concentration was controlled to maintain a constant ethylene partial pressure. The hydrogen was controlled to maintain a constant hydrogen to ethylene mole ratio. The concentrations of all the gases were measured by an on-line gas chromatograph to ensure relatively constant composition in the recycle gas stream.

The solid Catalyst 1 was injected directly into the fluidized bed using purified nitrogen as a carrier. Its rate was adjusted to maintain a constant production rate. In the case of the Catalyst 2, the catalyst was injected directly into the reactor as a slurry in purified mineral oil, and the rate of the slurry catalyst feed was adjusted to maintain a constant production rate of polymer. The reacting bed of growing polymer particles was maintained in a fluidized state by the continuous flow of the make-up feed and recycle gas through the reaction zone. A superficial gas velocity of 0.6-0.9 meters/sec was used to achieve this. The reactor was operated at a total pressure of 2240 kPa. The reactor was operated at a constant reaction temperature of 78° C., 95° C. or 105° C. depending on the desired product.

The additive was diluted in purified mineral oil to desired concentration level to form a slurry. The additive slurry was charged to an agitated slurry feeding vessel. The additive slurry was metered to the reactor at a rate to maintain the desired concentration in the bed based on polymer production rate. An inert hydrocarbon such as isopentane was used as a carrier medium.

The fluidized bed was maintained at a constant height by withdrawing a portion of the bed at a rate equal to the rate of formation of particulate product. The rate of product formation (the polymer production rate) was in the range of 15-25 kg/hour. The product was removed semi-continuously via a series of valves into a fixed volume chamber. This product was purged to remove entrained hydrocarbons and treated with a small steam of humidified nitrogen to deactivate any trace quantities of residual catalyst.

Examples 1-5

Tests were carried out in the above-mentioned polymerization reactor to evaluate the effect of a polyetheramine on reactor performance. The reactor was operated to produce a bimodal type product with 5 to 7 Flow Index and 0.9475 to 0.949 gm/cc density at the following reaction conditions: reaction temperature of 105° C., ethylene partial pressure of 220 psia, hexene-to-ethylene molar ratio of 0.0048 to 0.0050 and hydrogen-to-ethylene concentration of 15 ppm/mole %.

A 3 wt % emulsion slurry of PA-1 in a mineral oil/polyethylene gel was prepared and transferred to the slurry feeder. The PA-1 slurry feed was initiated, and the reactor was lined out at a feed rate of approximately 6 ppmw based on polymer production rate. An additional test was performed with the feed rate of the PA-1 slurry at approximately 20 ppmw. In both cases, static and temperature trends indicated good operability. For comparative purposes, additional tests were run with no continuity additive and with MIX-2. For operation with MIX-2, the continuity additive mixture was slurried in mineral oil (20 wt % MIX-2 in mineral oil) and fed to the reactor at the rate indicated in the table below.

The effect of PA-1 on catalyst productivity as compared to no additive and to MIX-2 is shown below in Table 1. As illustrated, a negligible loss in catalyst activity was observed (less than 5%). In comparison, a loss in catalyst activity of more than 20% was observed for MIX-2 at the same feed rate.

Examples 6 and 7

Additional tests were carried out in the above-mentioned polymerization reactor to evaluate the effect of using MIX-1 (75:25 mixture of JEFFAMINE® ED-2003 and aluminum distearate) as a continuity additive on reactor performance as compared to operation with MIX-2 (50:50 mixture of aluminum distearate and an ethoxylated amine type compound).

In Example 6, following the reactor start-up using Catalyst-2 mentioned above, the reactor was operated using MIX-2 to produce a polymer product with a 6.3 Flow Index and 0.9489 g/cc density suitable for pipe applications. The MIX-2 was fed to the reactor at rate to maintain a concentration in the bed of approximately 45 ppmw (based on polymer production rate).

Example 7 was carried out using the same reaction system and catalyst mentioned above except for using MIX-1 as a continuity additive. A batch of MIX-1 was prepared with a nominal 5 weight percent concentration in mineral oil and fed to the reactor at a feed rate to maintain a concentration in the bed of approximately 32 ppmw based on polymer production rate. The reactor was operated smoothly using this continuity additive mixture with no sheeting and negligible static activity in the bed.

TABLE 2

Effect of MIX-1 on Catalyst 2 Productivity

| Example | Continuity Additive | CA Level (ppmw) | FI | Density (g/cc) | Catalyst Productivity Material Balance (gm/gm) | Catalyst Productivity Zr ICPES Corr. (gm/gm) |
| --- | --- | --- | --- | --- | --- | --- |
| 6 | MIX-2 (Comp.) | 44.5 | 8.1 | 0.9495 | 7782 | 7050 |
| 7 | MIX-1 | 31.9 | 6.9 | 0.9495 | 8680 | 8935 |

As shown in Table 2 above, MIX-1 had less effect on Catalyst-2 productivity than MIX-2 (comparative). The improvement in catalyst productivity with MIX-1 was up to 25% over that achieved with MIX-2 (comparative) based on catalyst productivity as calculated based on residual Zr as measured by ICPES.

TABLE 1

Effect of PA-1 on Catalyst 2 Productivity

| | | | | | Catalyst Productivity | | | |
| --- | --- | --- | --- | --- | --- | --- | --- | --- |
| Example | Continuity Additive | CA Level (ppmw) | FI | Density (g/cc) | Material Balance (gm/gm) | Zr ICPES Corr. (gm/gm) | Zr XRF Basis Corr. (gm/gm) | Al ICPES Basis (gm/gm) |
| 1 | None (Comp.) | 0 | 5.86 | 0.9487 | 10920 | 12126 | 12322 | 13955 |
| 2 | MIX-2 (Comp.) | 20.2 | 5.11 | 0.9479 | 9000 | 9382 | 9101 | 9689 |
| 3 | MIX-2 (Comp.) | 40.5 | 7.02 | 0.9490 | 6497 | — | 6492 | — |
| 4 | PA-1 | 6.2 | 7.02 | 0.9490 | 11445 | 12444 | 10101 | 13750 |
| 5 | PA-1 | 21.4 | 5.19 | 0.9476 | 10177 | 11586 | 10344 | 12143 |

In the above table, the catalyst productivities as measured using Zr ICPES and Zr XRF were corrected for the total amount of residual Zr from the different catalyst components.

Examples 8-10

Another set of tests were carried out in a larger continuous pilot-scale gas phase fluidized bed reactor having a 0.6 meters internal diameter and 4.4 meters in bed height. The rate of product formation (the polymer production rate) was in the range of 40-50 kg/hour.

Examples 8-10 were carried out in the above-mentioned polymerization reactor to evaluate the effect of using MIX-1 as a continuity additive on reactor performance as compared to operation with MIX-2.

In Example 8, the reactor was operated using Catalyst-2 to produce a bimodal product with 5 Fl and 0.9475 gm/gm density product while feeding MIX-2 to the reactor at a rate to maintain a concentration in the bed of approximately 40 ppmw (based on polymer production rate).

Examples 9 and 10 were carried out using the same reaction system and catalyst mentioned above except for using MIX-1 as a continuity additive. A batch of MIX-1 was prepared with a nominal 10 weight percent concentration in mineral oil and fed to the reactor at a feed rate to maintain a concentration in the bed of approximately 48 ppmw based on polymer production rate (Example 9) and approximately 39 ppmw (Example 10). The reactor was operated smoothly using this MIX-1 with no sheeting and negligible static activity in the bed at both concentration levels.

TABLE 3

Effect of MIX-1 on Catalyst 2 Productivity

| Example | Continuity Additive | CA Level (ppmw) | FI | Density (g/cc) | Catalyst Productivity Material Balance (gm/gm) |
|---|---|---|---|---|---|
| 8 | MIX-2 (Comp.) | 39.8 | 4.96 | 0.9475 | 7144 |
| 9 | MIX-1 | 48.2 | 6.24 | 0.9492 | 8423 |
| 10 | MIX-1 | 38.9 | 6.13 | 0.9478 | 8995 |

As shown in Table 3 above, MIX-1 had less effect on Catalyst 2's productivity than MIX-2 (comparative). The improvement in catalyst productivity with MIX-1 was up to 18% at 48 ppmw additive concentration level and up to 26% at 39 ppmw additive level over that achieved with MIX-2 (comparative).

Examples 11-12

Additional tests were carried out in the above-mentioned polymerization reactor while running Catalyst 1 to evaluate the effect of polyetheramine on reactor performance. Initially, the reactor was operated at high density conditions to produce a product with a 49 to 52 Melt index and 0.952 to 0.954 gm/cc density using MIX-2, at a rate of approximately 16 ppmw. For operation, the MIX-2 was slurried in mineral oil (20 wt % MIX-2 in mineral oil). For the high-density conditions, the reactor was operated at the following reaction conditions: reaction temperature of 95° C., ethylene partial pressure of 220 psia, hexene-to-ethylene molar ratio of 0.0020 and hydrogen-to-ethylene concentration of 9.94 to 10.18 ppm/mole %. The reactor was transitioned to operation with PA-1. For operation with PA-1, a 3 wt % emulsion slurry of PA-1 in a mineral oil/polyethylene gel was prepared and fed to the reactor. Initially, feed of the PA-1 slurry was initiated at a rate of approximately 13 ppmw. After 2 hours, the rate of the PA-1 slurry was reduced to approximately 9-10 ppmw. No operability issues were observed during the transition from the continuity additive mixture to the polyetherdiamine. The reactor lined out smoothly under high density conditions using PA-1 as a continuity additive. As illustrated in Table 4 below, PA-1 appears to have a comparable effect on catalyst activity as MIX-2 at high density conditions.

TABLE 4

Effect of Polyetheramine on Catalyst 1 Productivity

| Example | Continuity Additive | CA Level (ppmw) | Melt Index (dg/min) | MFR (HLMI/MI) | Density (g/cc) | Material Balance (gm/gm) | Hf ICPES | Hf ICPES Corr. |
|---|---|---|---|---|---|---|---|---|
| 11 | MIX-2 (Comp.) | 15.9 | 51.8 | 20.3 | 0.9540 | 11092 | 8441 | 8187 |
| 12 | PA-1 | 8.9 | 49.1 | 20.0 | 0.9528 | 10229 | 8093 | 7931 |

In the above table, the Hf ICPES corrected was the I-If ICPES with correction for an approximately 3-hour residence time.

Examples 13-14

Additional tests were carried out in the above-mentioned polymerization reactor while running the Catalyst 1 to evaluate the effect of polyetheramine on reactor performance. The reactor was operated at the following conditions to produce a low density product as indicated in the table below: reaction temperature of 78° C., ethylene partial pressure of 220 psia, hexene-to-ethylene molar ratio of 0.0154 to 0.0160 and hydrogen-to-ethylene concentration of 4.96 to 5.11 ppm/mole %. The reactor was operated using PA-1 as a continuity additive. For operation with PA-1, a 3 wt % emulsion slurry of PA-1 in a mineral oil/polyethylene gel was prepared and fed to the reactor. The reactor was lined out at a feed rate of approximately 13.5 ppmw based on polymer production rate. The reactor lined out smoothly until the end of the run.

For comparative purposes, additional tests were run with MIX-2. For operation with MIX-2, the continuity additive mixture was slurried in mineral oil (20 wt % MIX-2 in mineral oil) and fed to the reactor at the rate indicated the table below. As illustrated in Table 5 below, PA-1 appears to have less effect on catalyst activity as MIX-3 at low density conditions.

TABLE 5

Effect of Polyetheramine on Catalyst 1 Productivity

| Example | Continuity Additive | CA Level (ppmw) | Melt Index (dg/min) | MFR (HLMI/MI) | Density (g/cc) | Catalyst Productivity Material Balance (gm/gm) | Hf ICPES | Hf ICPES Corr. |
|---|---|---|---|---|---|---|---|---|
| 13 | MIX-2 (Comp.) | 21.3 | 1.17 | 30.9 | 0.9185 | 16286 | 12661 | 12415 |
| 14 | PA-1 | 13.4 | 1.373 | 32.5 | 0.9202 | 19997 | 13534 | 12586 |

In the above table, the Hf ICPES corrected is the Hf ICPES with correction for an approximately 3-hour residence time.

Examples 15-17

Another set of tests were carried out in a large scale gas phase fluidized bed reactor of 2.44 meters internal diameter and 12.2 meters in bed height. The rate of product formation (the polymer production rate) was in the range of 4000-5000 kg/hour.

In Example 15, the reactor was operated using Catalyst-2 mentioned above to produce a bimodal product with 6.9 Fl and 0.9499 gm/gm density product while feeding MIX-2 to the reactor at rate to maintain a concentration in the bed of approximately 44 ppmw (based on polymer production rate).

Examples 16 and 17 were carried out using the same reaction system and catalyst mentioned above except for using MIX-1 as a continuity additive. A batch of MIX-1 was prepared with a nominal 10 weight percent concentration in mineral oil. In Example 16, MIX-1 was fed to the reactor at a feed rate to maintain a concentration in the bed of approximately 57 ppmw based on polymer production rate and in Example 17, MIX-1 was fed to the reactor to maintain a level of approximately 70 ppmw. The reactor was operated smoothly using this continuity additive mixture with no sheeting and negligible static activity in the bed at both concentration levels of MIX-1.

The effect of MIX-1 on catalyst productivity as compared to MIX-2 is shown below in Table 6.

TABLE 6

Effect of CA-mixture-1 on Catalyst 2 Productivity

| Example | Continuity Additive | CA Level (ppmw) | FI | Density (g/cc) | Catalyst Productivity Material Balance (gm/gm) | Catalyst Productivity Zr ICPES Corr. (gm/gm) |
|---|---|---|---|---|---|---|
| 15 | MIX-2 (Comp.) | 44.1 | 6.88 | 0.9499 | 5992 | 6340 |
| 16 | MIX-1 | 57.3 | 6.4 | 0.9493 | 7071 | 7339 |
| 17 | MIX-1 | 70 | 6.15 | 0.9500 | 6866 | 7188 |

As shown in Table 6 above, MIX-1 had less effect on Catalyst-2 productivity than MIX-2 (comparative). The improvement in catalyst productivity with MIX-1 was up to 15.7% at 57 ppmw additive concentration level and up to 13% at 70 ppmw additive level over that achieved with MIX-2 comparative) based on catalyst productivity as calculated based on residual Zr as measured by ICPES.

As described above, embodiments disclosed herein may provide polyetheramine additives, for use in polymerization reactors, such as a gas-phase reactor for the production of polyolefins. Use of the polyetheramine additives may advantageously provide for prevention, reduction, or reversal of sheeting and other discontinuity events. Polyetheramine additives may also provide for charge dissipation or neutralization without a negative effect on polymerization catalyst activity, as is commonly found to occur with conventional static control agents.

While compositions, methods, and processed are described herein in terms of "comprising," "containing," "having," or "including" various components or steps, the compositions and methods can also "consist essentially of" or "consist of" the various components and steps. The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited.

All documents cited herein are fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein. Although individual embodiments are discussed, the invention covers all combinations of all those embodiments.

What is claimed is:

1. A polymerization process, comprising:
   polymerizing an olefin to form an olefin-based polymer in a polymerization reactor; and introducing a polyetheramine additive to the polymerization reactor.

2. The polymerization process of claim 1, wherein the polyetheramine additive is introduced to the reactor in an amount ranging from about 0.01 ppmw to about 500 ppmw, based on polymer production rate.

3. The polymerization process of claim 1, wherein the polyetheramine additive comprises a polyetheramine, wherein the polyetheramine comprises a polymer backbone that terminates in at least one amino group, the polymer backbone comprising at least one monomer selected from ethylene oxide, propylene oxide, 1,2-butylene oxide, and tetramethylene oxide.

4. The polymerization process of claim 1, wherein the polyetheramine additive comprises a copolymer of ethylene oxide and propylene oxide.

5. The polymerization process of claim 1, wherein the polyetheramine additive comprises a polyetherdiamine of the following formula:

$$NH_2CH(CH_3)CH_2(OCH_2CH(CH_3))_a(OCH_2CH_2)_b(OCH_2CH(CH_3))_cNH_2$$

where a is 1 to 20, b is 1 to 10 and c is 1 to 10.

6. The polymerization process claim 1, wherein the polyetheramine additive is introduced to the polymerization reactor as a slurry of a polyetheramine and a liquid selected from a mineral oil, an aromatic hydrocarbon, an aliphatic hydrocarbon, and any combination thereof.

7. The polymerization process of claim 1, further comprising introducing a continuity additive to the polymerization reactor, wherein the continuity additive comprises a carboxylate metal salt, an ethoxylated amine, or a combination thereof.

8. The polymerization process of claim 1, wherein the polymerization reactor comprises a fluidized bed reactor, an entrainment zone, a catalyst feed for introducing a catalyst system capable of producing the polymer, and a polyetheramine additive feed for the feeding of the polyetheramine additive independently of the catalyst mixture, and further comprising monitoring a level of electrostatic activity in the entrainment zone and adjusting the amount of the polyetheramine additive introduced into the polymerization reactor to maintain the levels of electrostatic activity in the entrainment zone at or near zero.

9. The polymerization process of claim 1, further comprising introducing a catalyst system to the polymerization reactor, the catalyst system comprising a catalyst selected from a metallocene catalyst, a Ziegler-Natta catalyst, a chromium-based catalyst, a mixed catalyst system, and any combination thereof.

10. The polymerization process of claim 9, wherein the mixed catalyst system is a bimetallic catalyst system.

11. The polymerization process of claim 1, wherein the polyetheramine additive is introduced into the reactor in a catalyst system, the catalyst system comprising a polymerization catalyst and the polyetheramine additive.

12. The polymerization process of claim 1, wherein the polymerization reactor comprises a gas-phase reactor.

13. A process for copolymerizing ethylene and an alpha olefin in a gas phase reactor utilizing a metallocene catalyst, activator and support, comprising:
  combining reactants comprising ethylene and a monomer selected from 1-butene, 1-hexene, 4-methylpent-l-ene, 1-octene, and any combination thereof in the presence of a metallocene catalyst, an activator and a support;
  monitoring static in the gas phase reactor by a probe selected from a recycle line static probe, an upper bed static probe, an annular disk static probe, a distributor plate static probe, and any combination thereof;
  maintaining the static at a desired level by use of a polyetheramine additive, the polyetheramine additive present in the gas phase reactor in the range from about 0.1 ppmw to about 500 ppmw, based on the weight of polymer produced in the process.

14. A catalyst system comprising:
  a polymerization catalyst; and
  a polyetheramine additive,
  wherein the polymerization catalyst comprises a catalyst selected from a metallocene catalyst, a Ziegler-Natta catalyst, a chromium based catalyst, and any combination thereof.

15. The catalyst system of claim 14, wherein the polyetheramine comprises a polyetherdiamine of the following formula:

$$NH_2CH(CH_3)CH_2(OCH_2CH(CH_3))_a(OCH_2CH_2)_b(OCH_2CH(CH_3))_cNH_2$$

where a is 1 to 20, b is 1 to 10 and c is 1 to 10.

16. The catalyst system of claim 14, further comprising a continuity additive, wherein the continuity additive comprises a carboxylate metal salt, an ethoxylated amine, or a combination thereof.

17. The catalyst system of claim 14, comprising from 0.1 to 25 wt% of the polyetheramine based on the weight of catalyst system.

* * * * *